(12) United States Patent
Wu (10) Patent No.: US 11,907,548 B2
(45) Date of Patent: Feb. 20, 2024

(54) STORAGE OF VIDEO DATA AND FILE SYSTEM METADATA

(71) Applicant: Micron Technology, Inc., Boise, ID (US)

(72) Inventor: Minjian Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 657 days.

(21) Appl. No.: 17/047,327

(22) PCT Filed: Jul. 17, 2020

(86) PCT No.: PCT/CN2020/102705
§ 371 (c)(1),
(2) Date: Oct. 13, 2020

(87) PCT Pub. No.: WO2022/011683
PCT Pub. Date: Jan. 20, 2022

(65) Prior Publication Data
US 2023/0118273 A1    Apr. 20, 2023

(51) Int. Cl.
*G06F 3/06* (2006.01)

(52) U.S. Cl.
CPC .......... *G06F 3/0631* (2013.01); *G06F 3/0604* (2013.01); *G06F 3/0673* (2013.01)

(58) Field of Classification Search
CPC .... G06F 3/0631; G06F 3/0604; G06F 3/0673; G06F 2212/7207; G06F 12/0246; G06F 2212/1036; G06F 2212/7208; G06F 2212/7211
See application file for complete search history.

(56) References Cited

U.S. PATENT DOCUMENTS

| | | | | |
|---|---|---|---|---|
| 5,895,473 | A * | 4/1999 | Williard | G06V 30/416 715/255 |
| 7,305,540 | B1 * | 12/2007 | Trivedi | G06F 9/3879 712/3 |
| 8,180,995 | B2 | 5/2012 | Asnaashari et al. | |
| 8,332,578 | B2 | 12/2012 | Frickey, III et al. | |
| 8,402,243 | B2 * | 3/2013 | Wakrat | G11C 11/5642 711/170 |
| 8,595,354 | B2 * | 11/2013 | Chen | G06F 16/16 709/224 |
| 8,832,163 | B1 * | 9/2014 | O'Brien | G06F 16/13 707/831 |
| 9,710,165 | B1 * | 7/2017 | Lherault | G06F 3/0652 |

(Continued)

OTHER PUBLICATIONS

International Search Report and Written Opinion for related PCT Application No. PCT/CN2020/102705, dated Apr. 19, 2021, 9 pages.

(Continued)

*Primary Examiner* — Charles Rones
*Assistant Examiner* — Alexander Vinnitsky
(74) *Attorney, Agent, or Firm* — Brooks, Cameron & Huebsch, PLLC (57) ABSTRACT

A memory sub-system can allocate a first portion of blocks of a memory device for storage of file system metadata based on a file system and a capacity of the memory device, write video data received from a host within a second portion of the blocks at a first data density, and write file system metadata within the first portion of the blocks at a second data density lesser than the first data density.

19 Claims, 5 Drawing Sheets

(56) References Cited

U.S. PATENT DOCUMENTS

| | | | |
|---|---|---|---|
| 11,003,361 B2* | 5/2021 | Fackenthal | G06F 3/064 |
| 11,645,199 B2* | 5/2023 | Choi | G06F 3/064 |
| | | | 711/103 |
| 2010/0169604 A1 | 7/2010 | Trika et al. | |
| 2011/0271043 A1* | 11/2011 | Segal | G06F 12/0246 |
| | | | 711/E12.001 |
| 2014/0149473 A1* | 5/2014 | Kim | G06F 16/1847 |
| | | | 707/824 |
| 2015/0131375 A1 | 5/2015 | Kwak et al. | |
| 2016/0054931 A1 | 2/2016 | Romanovsky et al. | |
| 2016/0253238 A1 | 9/2016 | Strauss et al. | |
| 2016/0268000 A1 | 9/2016 | Thompson et al. | |
| 2018/0336144 A1* | 11/2018 | Olarig | G06F 12/1433 |
| 2019/0012484 A1* | 1/2019 | Gulati | H04L 9/0861 |
| 2019/0044536 A1 | 2/2019 | Khan et al. | |
| 2019/0310936 A1 | 10/2019 | Novogran et al. | |
| 2020/0183602 A1* | 6/2020 | Kabra | G06F 3/067 |
| 2020/0401557 A1* | 12/2020 | Struyve | G06F 3/0673 |
| 2021/0173561 A1* | 6/2021 | Mastenbrook | G06F 3/0604 |
| 2022/0269428 A1* | 8/2022 | Gong | G06F 3/0673 |

OTHER PUBLICATIONS

Lu et al., "Extending the Lifetime of Flash-based Storage through Reducing Write Amplification from File Systems", Jan. 2013, (14 pgs.), Proceedings of the 11th USENIX Conference on File and Storage Technologies.

* cited by examiner

STORAGE OF VIDEO DATA AND FILE SYSTEM METADATA

PRIORITY INFORMATION

This application is a National Stage Application under 35 U.S.C. § 371 of International Application Number PCT/CN2020/102705, filed on Jul. 17, 2020, the contents of which are incorporated herein by reference.

TECHNICAL FIELD

Embodiments of the disclosure relate generally to memory sub-systems, and more specifically, relate to storage of video data and file system metadata.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Vehicles are becoming more dependent upon memory sub-systems to provide storage for components that were previously mechanical, independent, or non-existent. A vehicle can include a computing system, which can be a host for a memory sub-system. The computing system can run applications that provide component functionality. The vehicle may be driver operated, driver-less (autonomous), and/or partially autonomous. The memory device can be used heavily by the computing system in a vehicle.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to storage of video data and file system metadata. A vehicle can include a memory sub-system, such as a solid state drive (SSD). The memory sub-system can be used for storage of data by applications that are run by a host system of the vehicle. An example of such an application is a black box of the vehicle. The memory cells in blocks of the SSD can be operated at different data densities with corresponding different data retention characteristics. It is desirable to store video data at a higher data density and lower data retention and to store file system metadata at a lower data density and higher retention for reasons explained in more detail herein.

The figures herein follow a numbering convention in which the first digit or digits correspond to the drawing figure number and the remaining digits identify an element or component in the drawing. Similar elements or components between different figures may be identified by the use of similar digits. For example, 122 may reference element "22" in FIG. 1, and a similar element may be referenced as 222 in FIG. 2. Analogous elements within a Figure may be referenced with a hyphen and extra numeral or letter. Such analogous elements may be generally referenced without the hyphen and extra numeral or letter. For example, elements 444-1, 444-2, . . . , 444-N in FIG. 4 may be collectively referenced as 444. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
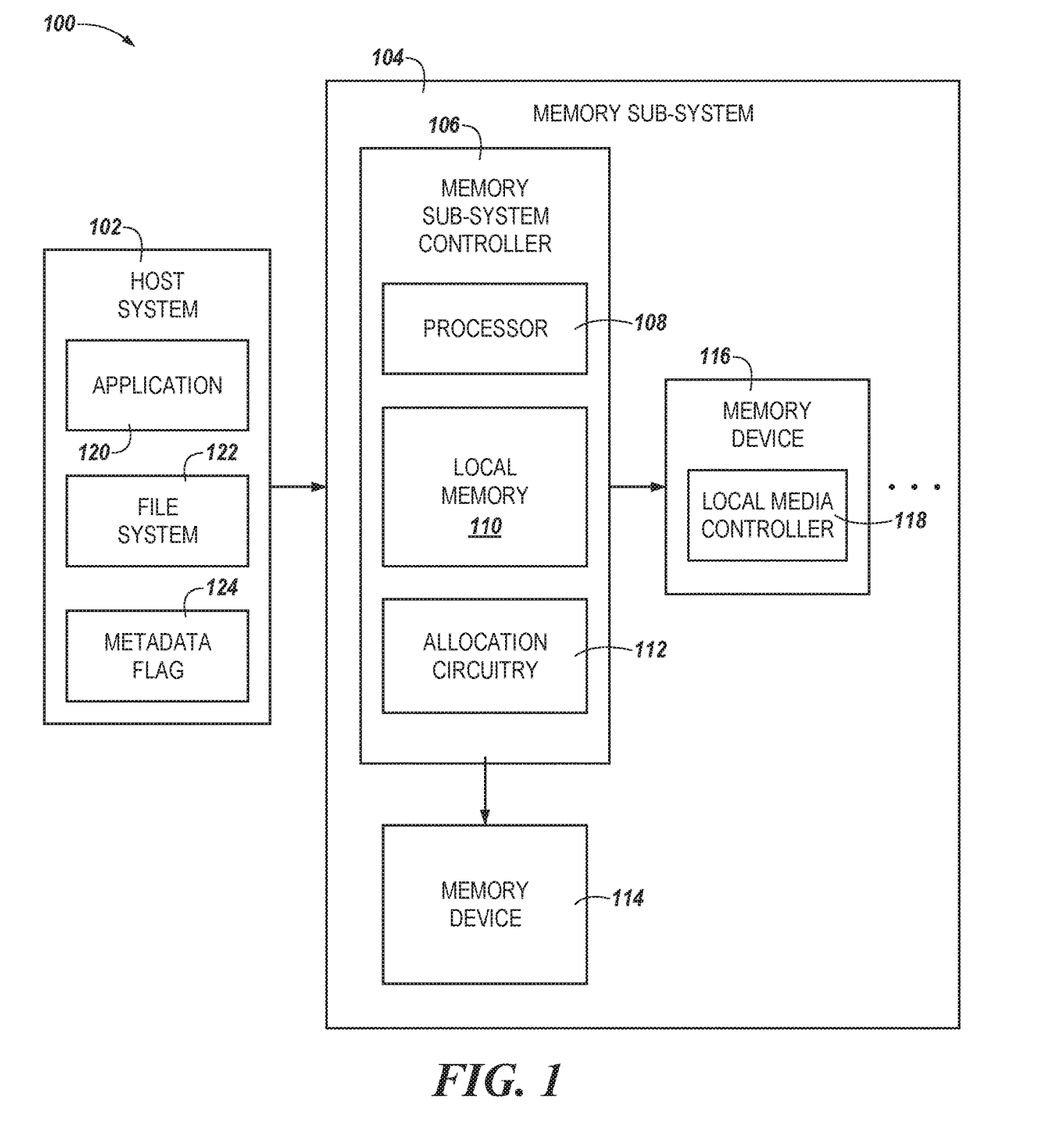
FIG. 1 illustrates an example computing system that includes a memory sub-system in accordance with some embodiments of the present disclosure.

FIG. 1 illustrates an example computing system 100 that includes a memory sub-system 104 in accordance with some embodiments of the present disclosure. The memory sub-system 104 can include media, such as one or more volatile memory devices 114, one or more non-volatile memory devices 116, or a combination thereof. The volatile memory devices 114 can be, but are not limited to, random access memory (RAM), such as dynamic random access memory (DRAM), synchronous dynamic random access memory (SDRAM), and resistive DRAM (RDRAM).

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 includes a host system 102 that is coupled to one or more memory sub-systems 104. The host system 102 can be a computing system included in a vehicle. The computing system can run applications that provide component functionality for the vehicle. In some embodiments, the host system 102 is coupled to different types of memory sub-systems 104. FIG. 1 illustrates an example of a host system 102 coupled to one memory sub-system 104. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 includes or is coupled to processing resources, memory resources, and network resources. As used herein, "resources" are physical or virtual components that have a finite availability within a computing system 100. For example, the processing resources include a processing device, the memory resources include memory sub-system 104 for secondary storage and main memory devices (not specifically illustrated) for primary storage, and the network resources include as a network interface (not specifically illustrated). The processing device can be one or more processor chipsets, which can execute a software stack. The processing device can include one or more cores, one or more caches, a memory controller (e.g., NVDIMM controller), and a storage protocol controller (e.g., PCIe controller, SATA controller, etc.). The host system 102 uses the memory sub-system 104, for example, to write data to the memory sub-system 104 and read data from the memory sub-system 104.

The host system 102 can run one or more applications 120. The application 120 can represent applications that run on an operating system (not specifically illustrated) executed by the host system 102. An operating system is system software that manages computer hardware, software resources, and provides common services for applications 120. An application 120 is a collection of instructions that can be executed to perform a specific task. By way of example, the application 120 can be a black box application for a vehicle, as described in more detail herein, however embodiments are not so limited.

The host system can use a file system 122 including structure and logic rules that controls how groups of data, called files, are stored and retrieved. Without a file system 122, data saved to the memory sub-system 104 would be one large body of data with no way to tell where one piece of data stops and the next begins. By separating the data into pieces and giving each piece a name, the data is easily isolated and identified. The file system 122 can include layers such as a logical file system and a physical file system. A logical file system is responsible for interaction with the application 120. It provides an application program interface for file operations (e.g., read, write, erase, etc.) and passes the requested operation to the next layer for processing. The logical file system provides file access, directory operations, and security. A physical file system interacts with the physical operation of the memory sub-system 104, such as physical blocks being read/written, buffers, memory management, etc. The physical file system interacts with device drivers or with the channels to the memory sub-system 104. Examples of file systems 122 include file allocation table (e.g., FAT32), extended file system (e.g., EXT3, EXT4, etc.), and b-tree file system (Btrfs). EXT3 and EXT4 are journaled file systems that are used by the Linux kernel. The EXT3 file system uses ordered journaling requires file data to be written before file system metadata, whereas EXT4 uses delayed allocation, which does not have such a requirement. In EXT4, block allocation is delayed until data is flushed to the disk as opposed to allocating blocks even when data is in cache. Delayed allocation can reduce fragmentation by allocating larger blocks at a time.

Files stored according to a file system 122 are stored with file system metadata. File system metadata is associated with each file. The file system metadata can include the times recorded by the operating system when a file is modified, accessed, or created, a length of the file data (e.g., a number of blocks or byte count), a device type, a user identifier, a group identifier, access permissions, file attributes (e.g., read-only, executable, etc.), among other types of file system metadata. The file system 122 typically does not interleave the file system metadata with the associated file, however according to some previous approaches, the file system metadata is stored adjacent to the associated file in the physical storage medium. For example, one block of memory may store at least a portion of the file and at least a portion of the file system metadata. FAT32 file system metadata includes creation and last access timestamps. EXT4 file system metadata includes file owner, portable operating system interface (POSIX) file permissions, creation timestamp, and last access timestamp.

The basic layout of an EXT partition includes a boot block and a number of block groups. The "blocks" described with respect to the EXT partition refer to file system blocks, rather than blocks of physical memory. Each block group includes a super block, group descriptions in a number of blocks, a data block bitmap, an indes node (inode) bitmap, an inode table in a number of blocks, and a number of data blocks. The block size is determined during the partition format and is recorded on the super block. Some examples of block sizes are 1 k, 2 k, 4 k, and 8 k, however not all block sizes are supported for all setups. In EXT file systems, each object is represented by an inode. The inode structure contains pointers to the filesystem blocks that contain the data held in the object and all of the metadata about an object except its name. The metadata about an object includes the permissions, owner, group, flags, size, number of blocks used, access time, change time, modification time, deletion time, number of links, fragments, version, extended attributes, and/or access control lists.

As used herein, "file system metadata" is distinguished from application metadata. Application metadata is found within files to which it refers and is recorded by the application 120. Application metadata is also referred to in the art as file metadata. Examples of such application/file metadata include picture metadata and video metadata. Picture metadata can contain information about the make and model of the camera used to take the picture or about the software used to modify a picture. Video metadata includes operational gathered metadata (e.g., info about the content produced, such as the type of equipment, software, data, and location) and human-authored metadata to improve search engine visibility, discoverability, audience engagement, advertising, etc. In compressed video data, some video file reference frames may be referred to as metadata, which is another form of file metadata. A video file reference frame is a frame of compressed video that is used to define future frames.

The host system 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open not-and (NAND) Flash Interface (ONFI), Double Data Rate (DDR), Low Power Double Data Rate (LPDDR), or any other interface. The physical host interface can be used to transmit data between the host system 102 and the memory sub-system 104. The host system 102 can further utilize an NVM Express (NVMe) interface to access the non-volatile memory devices 116 when the memory sub-system 104 is coupled with the host system 102 by the PCIe interface. The physical host interface can provide an interface for passing control, address, data, and other signals between the memory sub-system 104 and the host system 102. FIG. 1 illustrates a memory sub-system 104 as an example. In general, the host system 102 can access multiple memory sub-systems via a same communication connection, multiple separate communication connections, and/or a combination of communication connections.

The host system 102 can send requests to the memory sub-system 104, for example, to store data in the memory sub-system 104 or to read data from the memory sub-system 104. For example, the host system 102 can use the memory sub-system 104 to provide storage for the black box application 120. The data to be written or read, as specified by a host request, is referred to as "host data." A host request can include logical address information. The logical address information can be a logical block address (LBA), which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

An example of non-volatile memory devices 116 include NAND type flash memory. NAND type flash memory includes, for example, two-dimensional NAND (2D NAND) and three-dimensional NAND (3D NAND). The non-volatile memory devices 116 can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory devices 116 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the non-volatile memory devices 116 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 116 can be grouped as pages that can refer to a logical unit of the memory device used to store data. With some types of memory (e.g., NAND), pages can be grouped to form blocks.

The memory sub-system controller 106 (or controller 106 for simplicity) can communicate with the non-volatile memory devices 116 to perform operations such as reading data, writing data, erasing data, and other such operations at the non-volatile memory devices 116. The memory sub-system controller 106 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 106 can be a microcontroller, special purpose logic circuitry (e.g., a field programmable gate array (FPGA), an application specific integrated circuit (ASIC), etc.), or other suitable circuitry.

The memory sub-system controller 106 can include a processing device 108 (e.g., a processor) configured to execute instructions stored in local memory 110. In the illustrated example, the local memory 110 of the memory sub-system controller 106 is an embedded memory configured to store instructions for performing various processes, operations, logic flows, and routines that control operation of the memory sub-system 104, including handling communications between the memory sub-system 104 and the host system 102.

In some embodiments, the local memory 110 can include memory registers storing memory pointers, fetched data, etc. The local memory 110 can also include ROM for storing micro-code, for example. While the example memory sub-system 104 in FIG. 1 has been illustrated as including the memory sub-system controller 106, in another embodiment of the present disclosure, a memory sub-system 104 does not include a memory sub-system controller 106, and can instead rely upon external control (e.g., provided by an external host, or by a processor or controller separate from the memory sub-system 104).

In general, the memory sub-system controller 106 can receive information or operations from the host system 102 and can convert the information or operations into instructions or appropriate information to achieve the desired access to the non-volatile memory devices 116 and/or the volatile memory devices 114. The memory sub-system controller 106 can be responsible for other operations such as wear leveling operations, error detection and/or correction operations, encryption operations, caching operations, and address translations between a logical address (e.g., logical block address) and a physical address (e.g., physical block address) associated with the non-volatile memory devices 116. The memory sub-system controller 106 can further include host interface circuitry to communicate with the host system 102 via the physical host interface. The host interface circuitry can convert a query received from the host system 102 into a command to access the non-volatile memory devices 116 and/or the volatile memory devices 114 as well as convert responses associated with the non-volatile memory devices 116 and/or the volatile memory devices 114 into information for the host system 102.

In some embodiments, the memory sub-system 104 can be a managed NAND (MNAND) device in which an external controller (e.g., controller 106) is packaged together with one or more NAND die (e.g., the non-volatile memory device 116). In an MNAND device, the external controller 106 can handle high level memory management functions such as media management and the local media controller 118 can manage some of the lower level memory processes such as when to perform programming operations.

In at least one embodiment, the allocation circuitry 112 is an ASIC configured to perform the examples described herein. For example, the allocation circuitry 112 can allocate a first portion of a plurality of blocks of a memory device (e.g., the non-volatile memory device 116) for storage of file system metadata based on a file system 122 and a capacity of the memory device. In some embodiments, a local media controller 118 of the non-volatile memory device 116 includes at least a portion of the allocation circuitry 112. For example, the local media controller 118 can include a processor (e.g., processing device) configured to execute instructions stored on the volatile memory devices 114 for performing the operations described herein. In some embodiments, the allocation circuitry 112 is part of the host system 102, an application 120, or an operating system. In at least one embodiment, the allocation circuitry 112 represents data or instructions stored in the memory sub-system 104. The functionality described with respect to the allocation circuitry 112 can be embodied in machine-readable and executable instructions stored in a tangible machine-readable medium.

The controller 106 (e.g., with use of the processor 108, instructions stored in the local memory 110, and/or the allocation circuitry 112) can be configured to determine the file system 122 used by the host system 102. The file system 122 can be determined based on file system metadata received from the host system 102 via the host interface. The format of the received file system metadata can reveal the type of file system used by the host system 102. In some embodiments, the host system 102 can be configured to provide a definition of the type of file system 122 used by the host system 102 to the memory sub-system 104. For example, the definition can be provided prior to the host system 102 providing file system metadata and/or other data such as video data to the memory sub-system 104. The definition of the fie system 122 can include an instruction to cause the memory sub-system 104 to store flagged data in a portion of the memory sub-system 104 allocated so as not to be wear leveled with a remainder of the memory sub-system 104. The controller 106 can be configured to prevent blocks of the allocated portion from being reallocated to a remainder of the non-volatile memory device 116 (e.g., to prevent those blocks from being wear leveled).

The memory sub-system 104 can be configured to perform wear leveling on blocks of the non-volatile memory device 116. Wear leveling is used to control the wear rate on the memory blocks. Wear leveling can increase the life of a non-volatile memory device that can experience failure after a number of program/erase cycles. Wear leveling can include dynamic wear leveling to minimize the amount of valid blocks moved to reclaim a block. Dynamic wear leveling can include a technique called garbage collection in which blocks with a number of invalid pages (i.e., pages with data that has been re-written to a different page and/or is no longer needed on the invalid pages) are reclaimed by erasing the block. Static wear leveling includes writing static data to blocks that have high erase counts to prolong the life of the block. According to at least one embodiment of the present disclosure, it is advantageous to perform wear leveling on blocks storing flagged data, specifically file system metadata, separately from blocks storing other data. According to at least one embodiment of the present disclosure, it is advantageous to not perform wear leveling on blocks storing the flagged data. For example, blocks that are intended to be used for storage of file system metadata would normally be erased and used to store other data according to most wear levelling algorithms to balance the program/erase cycle count across all blocks in the memory sub-system 104. However, this could result in the flagged data being stored in memory cells operated at an undesirable density level (e.g., a higher density level, as described herein). Separate wear leveling or not wear leveling blocks that store flagged data can prevent this from occurring.

The controller 106 can be configured to allocate a portion of the non-volatile memory device 116 for storage of flagged data received via the host interface, such as data marked with a metadata flag 124. The controller 106 can be configured to determine a size of the portion to be allocated. The determination of the size of the portion can be made based on a file system metadata overhead associated with the file system 122 and a capacity of the non-volatile memory device 116. The file system metadata overhead ratio can be known for various file systems 122. The size of the allocated portion is sufficient to store the amount of file system metadata that will accompany the data (e.g., video data) to be stored in the non-volatile memory device 116. Because the overall percentage of file system metadata is reasonable, the allocated portion will not have a significant impact on the storage density of the non-volatile memory device 116 (e.g., for storage of video data associated with a black box application).

The controller 106 and/or the local media controller 118 can be configured to operate memory cells of the allocated portion in an SLC mode. The controller 106 and/or the local media controller 118 can be configured to operate memory cells of a remainder of the non-volatile memory device 116 in greater than SLC mode (e.g., MLC, TLC, QLC, etc.) for storage of non-flagged data received from the host interface. Operating memory cells in "greater than SLC mode" means storing more than one bit in the memory cells. The flagged data is file system metadata and the non-flagged data is other data, such as video data, user data, system data, file metadata, or application metadata. The host system 102 can be configured to provide file system metadata to the memory sub-system 104 with a flag 124 indicating that the file system metadata is file system metadata (as opposed to other data) and is to be written at a first data density (e.g., SLC, MLC, TLC, etc.). The host system 102 can be configured to provide video data to the memory sub-system without the flag 124 indicating that the video data is to be written at a second data density (e.g., MLC, TLC, QLC, etc.) greater than the first data density. The host system 102 can be configured to provide application metadata with video data to the memory sub-system 104 without the flag 124.

Storing data with a lesser data density can provide better data retention over time (how long a memory cell reliably stores the data programmed thereto). For embodiments in which the non-volatile memory device 116 includes flash memory cells, each increase in data density (e.g., from SLC to MLC to TLC to QLC) is accompanied by a decrease in data retention capability. Soring one-bit per cell is referred to as SLC. The "level" in single-level cell refers to the quantity of states to which the cell is programed, other than an erased state (level). An SLC can be programmed to one level other than the erased level. MLCs, TLCs, QLCs, PLCs, etc. can be programmed to multiple levels other than the erased state. For a given range of threshold voltages, programming memory cells to more levels reduces a spread of threshold voltages between the data states. A smaller spread of threshold voltages between data states, which is referred to herein as a read window, reduces the data retention because it can be more difficult to distinguish between the data states. As the memory cell ages, is exposed to different operating conditions such as changing temperatures, or stores data over time, the ability of the cell to maintain a specific threshold voltage decreases, which can decrease the read window for the memory cell and thus the retention. For embodiments in which the application 120 is a black box application, the memory sub-system is an automotive grade SSD, and the non-volatile memory device 116 includes a plurality of memory dies with flash memory cells, it can be beneficial to store file system metadata at a lesser data density than video data as described in more detail with respect to FIG. 2.

The memory sub-system 104 can also include additional circuitry or components that are not illustrated. In some embodiments, the memory sub-system 104 can include a cache or buffer (e.g., DRAM) and address circuitry (e.g., a row decoder and a column decoder) that can receive an address from the memory sub-system controller 114 and decode the address to access the non-volatile memory devices 116.

Figure 2:
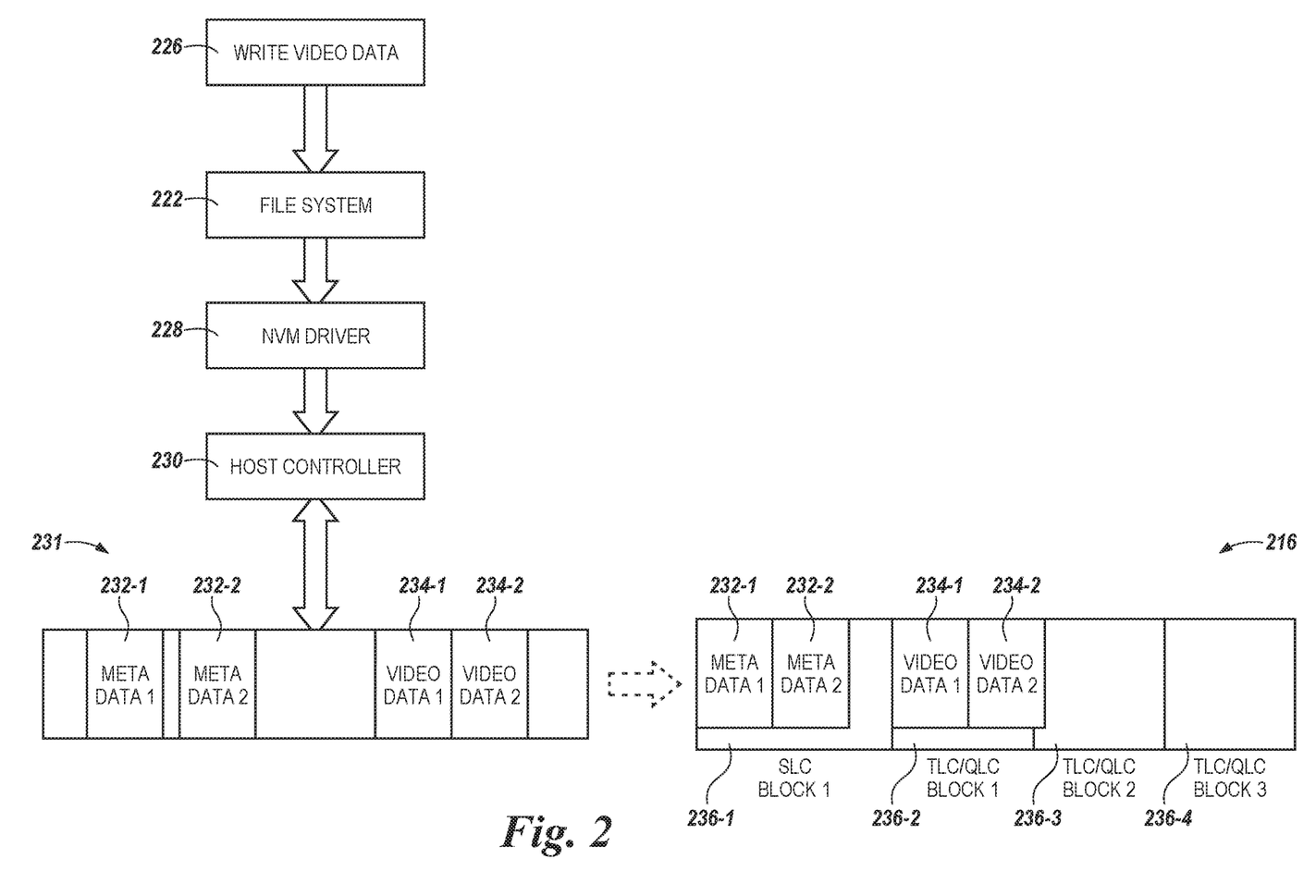
FIG. 2 is a flow diagram of video data and file system metadata being stored in a non-volatile memory device in accordance with some embodiments of the present disclosure.

FIG. 2 is a flow diagram of video data 234 and file system metadata 232 being stored in a non-volatile memory device 216 in accordance with some embodiments of the present disclosure. A host system can write video data as shown at block 226. For example, the host system can be a computing system on a vehicle that receives video data from one or more cameras and stores the video data (e.g., in association with a black box application for the vehicle). The black box for a vehicle may also be referred to as an accident data recorder. With the advent of autonomous vehicles, some autonomous driving requires real time buffering of telemetric data such as video cameras, RADAR, LIDAR, ultrasonic and other sensors necessary to playback the sequences preceding an accident. The video data 234 yields a considerable quantity of data per unit time for sequential write throughput from a host system. Upon an event, a quantity (e.g., thirty (30) seconds) of playback time immediately preceding an event needs to be captured to determine the cause of an incident. A playback may be referred to as a "snapshot". The application that controls storage of such information is referred to herein as a black box. A black box is one such application in where the user capacity requirement could be as low as one hundred and twenty-eight (128) GB, but the total bytes written (TBW) requirement could be as high as hundreds of Peta Bytes. The examples of values given are not limiting but highlight the relative difference between the requirements for capacity and TBW. A black box may need to store at least a few, most recent snapshots.

The host system can write the video data 234 according to a file system of the host as shown at block 222. Accordingly, the video data 234 to be written can be combined with file system metadata 232 by the host system. A non-volatile memory driver 228 is software run by the host system that operates or controls the non-volatile memory device 216. The host controller 230 is hardware that connects the host system to the non-volatile memory device 216. The host controller 230 can be part of the host system, the non-volatile memory device 216, or distributed between the two. From the perspective of the host system, storage of data in the non-volatile memory device 216 can be represented logically as illustrated at 231. Each quanta of video data 234 is a separate logical entity from the accompanying file system meta data 232. For example, "video data 1" 234-1 and "video data 2" 234-2 are depicted as separate logical entities from "meta data 1" 232-1 and "meta data 2" 232-2 in the logical representation 231. "Meta data 1" 232-1 is the file system metadata that accompanies "video data 1" 234-1 and "meta data 2" 232-2 is the file system metadata that accompanies "video data 2" 234-2.

According to some previous approaches to storing video data and accompanying file system metadata, when writing the data to the physical medium, the video data and accompanying file system meta data may be combined or written into the same blocks (not specifically illustrated). However, according to at least one embodiment of the present disclosure, when the video data 234 and accompanying file system meta data 232 are written to the non-volatile memory device, they are written separately from each other. For example, as shown in the depiction of some blocks of the non-volatile memory device 216, "meta data 1" 232-1 and "meta data 2" 232-2 are written to a first block 236-1, while "video data 1" 234-1 is written to a second block 236-2 and "video data 2" 234-2 is written to the second block 236-2 and a third block 236-3. A fourth block 236-4 is depicted, although without data being written thereto. Furthermore, the first block 236-1 to which the file system metadata 232 is written is operated at a lower data density than the blocks to which the video data 234 is written. For example, as illustrated in FIG. 2, the first block 236-1 is operated as an SLC block and the remaining blocks 236-2, 236-3, 236-4 are operated as TLC or QLC blocks.

The retention of the video data 234 is not as important as the retention of the file system metadata 232, which is why the file system metadata 232 is stored in blocks 236 operated at a lower data density. Based on the operation of the black box, the video data is likely to be obsolete after a relatively short period of time compared to the file system metadata 232. For example, the video data 234 may be obsolete after about two weeks, however, the file system metadata 232 needs to be retained in order to preserve the integrity of the file system 222. Preserving the file system 222 allows other data to be retrieved and prevents corruption of the file system 222 with unreadable data. Therefore, it is beneficial to store the file system metadata in high retention blocks 236-1 that are operated at a lower data density than other blocks 236-2, 236-3, 236-4.

An example video stream can create data at 2 megabytes per second (MB/s) for 8 hours per day. The last 8 hours of video data may be requested to be maintained before being erased to allow the storage blocks to be used for other data. Thus, at least 56.25 gigabytes (GB) of storage are needed for this purpose (2 MB/s*60 s/minute*60 minutes/hour*8 hours/1024 MB/GB). It would be inefficient, in terms of storage density, to operate the non-volatile memory in SLC mode to store the video data because it would increase the cost of the system by requiring the provisioning of extra memory.

An example write amplification for the non-volatile memory in which the video data is stored is 1.5. Write amplification is a process that occurs when writing data to solid state memory arrays. When randomly writing data in a memory array, the memory array scans for free space in the array. Free space in a memory array can be individual cells, pages, and/or blocks of memory cells that are not programmed. If there is enough free space to write the data, then the data is written to the free space in the memory array. If there is not enough free space in one location, the data in the memory array is rearranged by erasing, moving, and rewriting the data that is already present in the memory array to a new location leaving free space for the new data that is to be written in the memory array. The rearranging of old data in the memory array can be called write amplification because the amount of writing the memory arrays has to do in order to write new data is amplified based upon the amount of free space in the memory array and the size of the new data that is to be written on the memory array. An example life of the device is 5 years. Therefore, the expected program/erase cycles are then greater than or equal to 2406 for a 64 GB storage device (2 MB/s*60 s/minute*60 minutes/hour*8 hours/day*365 days/year*5 years*1.5/(64 GB [size of storage] *1024 MB/GB).

The following examples of data densities and retention characteristics exemplify the benefits of storing file system metadata 232 at a lower data density. Some non-volatile memory devices operated in TLC mode can provide data retention for 5 years at 55 degrees Celsius, but only for 300 program/erase cycles. The same devices operated in TLC mode can provide data retention for 1 year at the same temperature for 3000 program/erase cycles. The same devices operated in TLC mode can provide data retention for 0.5 years at the same temperature for 5000 program/erase cycles. The same devices operated in SLC mode can provide data retention for 5 years at the same temperature for 3000 program/erase cycles.

The quantity of blocks 236 to be operated as low data density blocks, such as the SLC block 236-1, can be configured based on a total size of the non-volatile memory device 216 and the fie system 222. The file system metadata overhead ratio can be known for various file systems 222. For example, EXT3 and EXT4 have a 3.2% file system metadata overhead, FAT32 has a 0.2% file system metadata overhead, and Btrfs has a 0.4% file system metadata overhead. The file system metadata overhead can be multiplied by the capacity of the non-volatile memory device 216 to determine the size of the portion (e.g., quantity of blocks) to be allocated. In some embodiments an additional amount can be added to the file system metadata overhead multiplied by the capacity of the non-volatile memory device 216 as an additional buffer and/or to allow the portion to have a convenient granularity, such as a whole number of blocks of physical memory or another granularity of physical memory. The size of the allocated portion is sufficient to store the amount of file system metadata that will accompany the data (e.g., video data) to be stored in the non-volatile memory device 216. Because the overall percentage of file system metadata is reasonable, the allocated portion will not have a significant impact on the storage density of the non-volatile memory device 216 (e.g., for storage of video data associated with a black box application).

Figure 3:
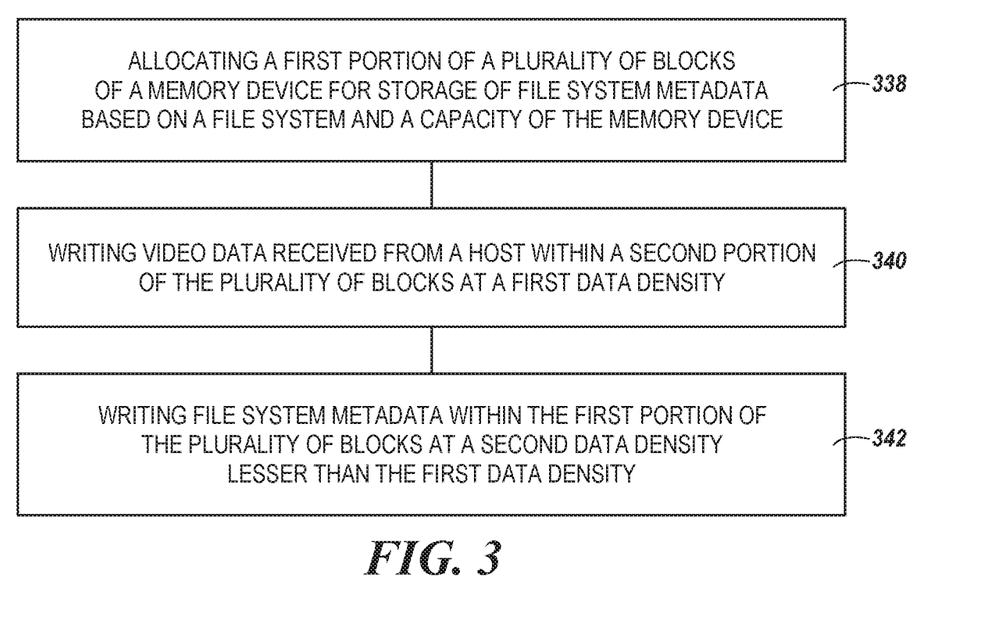
FIG. 3 is a flow diagram of an example method for operating a memory device accordance with some embodiments of the present disclosure.

FIG. 3 is a flow diagram of an example method for operating a memory device accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by or using the memory sub-system controller 106, processing device 108, allocation circuitry 112, non-volatile memory device 116 and/or volatile memory device 114, and/or local media controller 118 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 338 in the example method of FIG. 3, a first portion of a plurality of blocks of a memory device (e.g., the non-volatile memory device 116 illustrated in FIG. 1) can be allocated for storage of file system metadata based on a file system and a capacity of the memory device, such as is described above with respect to FIG. 2. In at least one embodiment, the first portion can be allocated during initialization of the file system. For example, when the host system initializes the file system, it can send a command to the memory device to allocate the first portion.

At block 340 in the example method of FIG. 3, video data from a host (e.g., the host system 102 illustrated in FIG. 1) can be written within a second portion of the plurality of blocks at a first data density. Application metadata (as opposed to file system metadata) can be written with the video data within the second portion. The memory device can be operated to provide storage for a black box application executed by the host for a vehicle and the video data can be data from one or more cameras associated with the vehicle.

At block 342 in the example method of FIG. 3, file system metadata can be written within the first portion of the plurality of blocks at a second data density lesser than the first data density. The file system metadata can be written in response to receiving data from the host with a flag indicating that the data is file system metadata. The video data can be written in response to receiving data from the host without the flag. The flag can be used to indicate to the memory device whether the data being sent to the memory device form the host is to be written to the first portion of the memory device allocated for storage of file system metadata. Any other data being sent from the host would not be sent with a flag. Such embodiments can simplify control of the memory device such that the memory device does not have to make an independent determination whether incoming data is file system metadata.

In some embodiments, the file system metadata can be written by programming memory cells of the memory device, specifically memory cells of the first portion of the memory device, in an SLC mode. The file system metadata can be written by programming memory cells of the memory device with a lesser data density than that of the memory cells programmed to store video data or other data. For example, memory cells of the second portion can be programmed in an MLC, TLC, QLC, PLC, or other mode that is greater than the mode used for programming memory cells of the first portion. Programming memory cells with a lesser data density yields better data retention, which is more important for storage of file system metadata than for storage of video data. The lesser data density comes with an increased cost of storage (by requiring more memory). Therefore, the video data, which uses the majority of the storage of the memory device, can be stored at a greater data density.

The second portion of the memory device can be wear leveled separately from the first portion of the memory device. This can prevent blocks of memory in the first portion from being reallocated to the second portion. In addition to being operated at a lesser data density, it is beneficial for the blocks of the first portion to remain allocated to the first portion so that worn blocks are not being used to store file system metadata, which could occur if wear leveling was performed across both the first and second portions. Blocks of the first portion of the memory device can be prevented from being reallocated to a different portion unless the file system is reformatted by the host. Preventing the blocks from being reallocated can help preserve the integrity of the file system. In at least one embodiment, the first portion of the memory device is prevented from reallocating the first portion.

Figure 4:
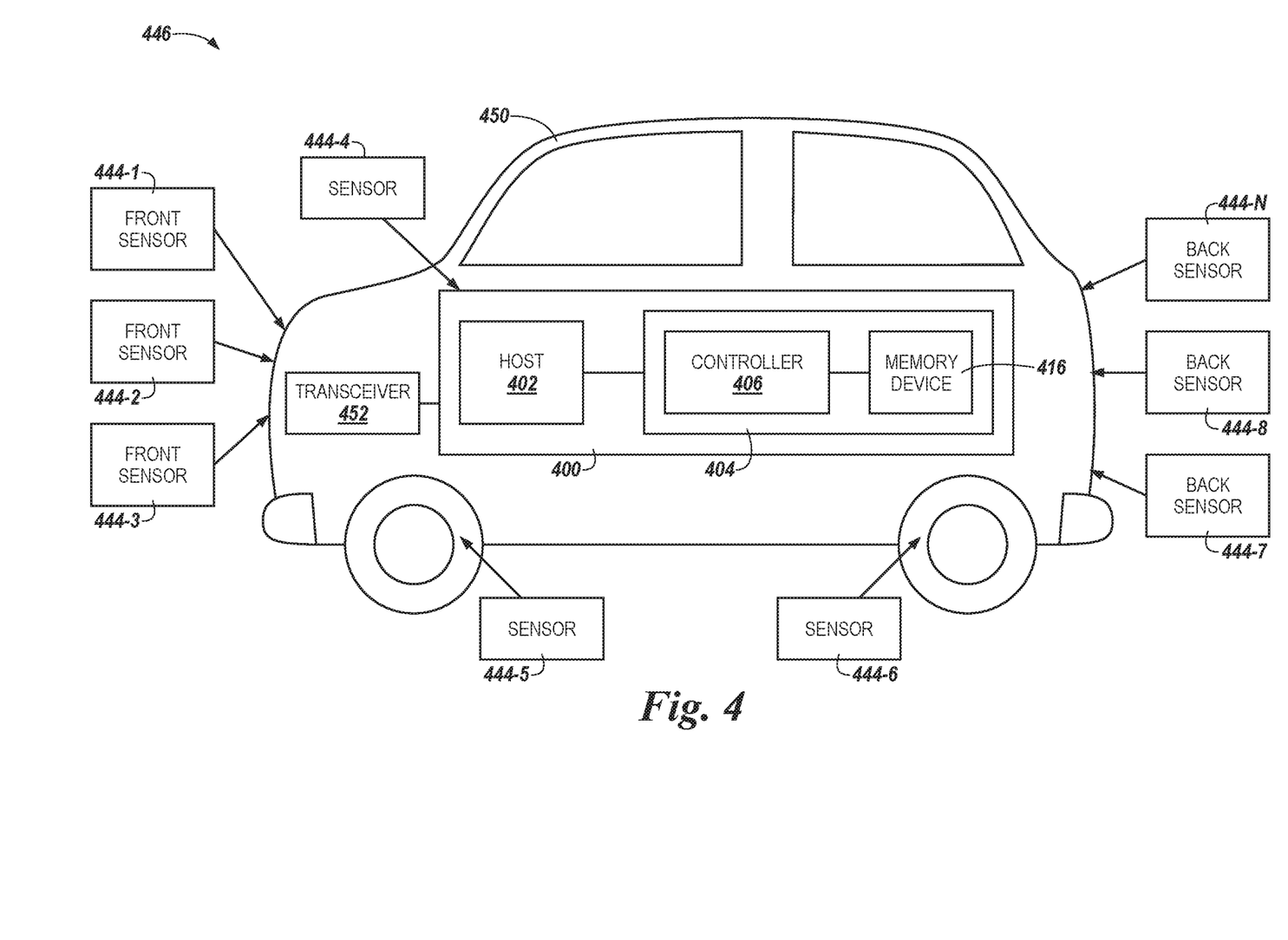
FIG. 4 illustrates an example of a system including a computing system in a vehicle in accordance with some embodiments of the present disclosure.

FIG. 4 illustrates an example of a system 446 including a computing system 400 in a vehicle in accordance with some embodiments of the present disclosure. The computing system 400 can include a memory sub-system 404, which is illustrated as including a controller 406 and non-volatile memory device 416 for simplicity but is analogous to the memory sub-system 104 illustrated in FIG. 1. The computing system 400, and thus the host 402, can be coupled to a number of sensors 444 either directly, as illustrated for the sensor 444-4 or via a transceiver 452 as illustrated for the sensors 444-1, 444-2, 444-3, 444-5, 444-6, 444-7, 444-8, . . ., 444-N. The transceiver 452 is able to receive data from the sensors 444 wirelessly, such as by radio frequency communication. In at least one embodiment, each of the sensors 444 can communicate with the computing system 400 wirelessly via the transceiver 452. In at least one embodiment, each of the sensors 444 is connected directly to the computing system 400 (e.g., via wires or optical cables).

The vehicle 450 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 444 are illustrated in FIG. 4 as including example attributes. For example, sensors 444-1, 444-2, and 444-3 are cameras collecting data from the front of the vehicle 450. Sensors 444-4, 444-5, and 444-6 are microphone sensors collecting data from the from the front, middle, and back of the vehicle 450. The sensors 444-7, 444-8, and 444-N are cameras collecting data from the back of the vehicle 450. As another example, the sensors 444-5, 444-6 are tire pressure sensors. As another example, the sensor 444-4 is a navigation sensor, such as a global positioning system (GPS) receiver. As another example, the sensor 444-6 is a speedometer. As another example, the sensor 444-4 represents a number of engine sensors such as a temperature sensor, a pressure sensor, a voltmeter, an ammeter, a tachometer, a fuel gauge, etc. As another example, the sensor 444-4 represents a camera. Video data can be received from any of the sensors 444 associated with the vehicle 450 comprising cameras. In at least one embodiment, the video data can be compressed by the host 402 before providing the video data to the memory sub-system 404.

The host 402 can execute instructions to provide an overall control system and/or operating system for the vehicle 450. The host 402 can be a controller designed to assist in automation endeavors of the vehicle 450. For example, the host 402 can be an advanced driver assistance system controller (ADAS). An ADAS can monitor data to prevent accidents and provide warning of potentially unsafe situations. For example, the ADAS can monitor sensors in the vehicle 450 and take control of vehicle 450 operations to avoid accident or injury (e.g., to avoid accidents in the case of an incapacitated user of a vehicle). The host 402 may need to act and make decisions quickly to avoid accidents. The memory sub-system 404 can store reference data in the non-volatile memory device 416 such that data from the sensors 444 can be compared to the reference data by the host 402 in order to make quick decisions.

Figure 5:
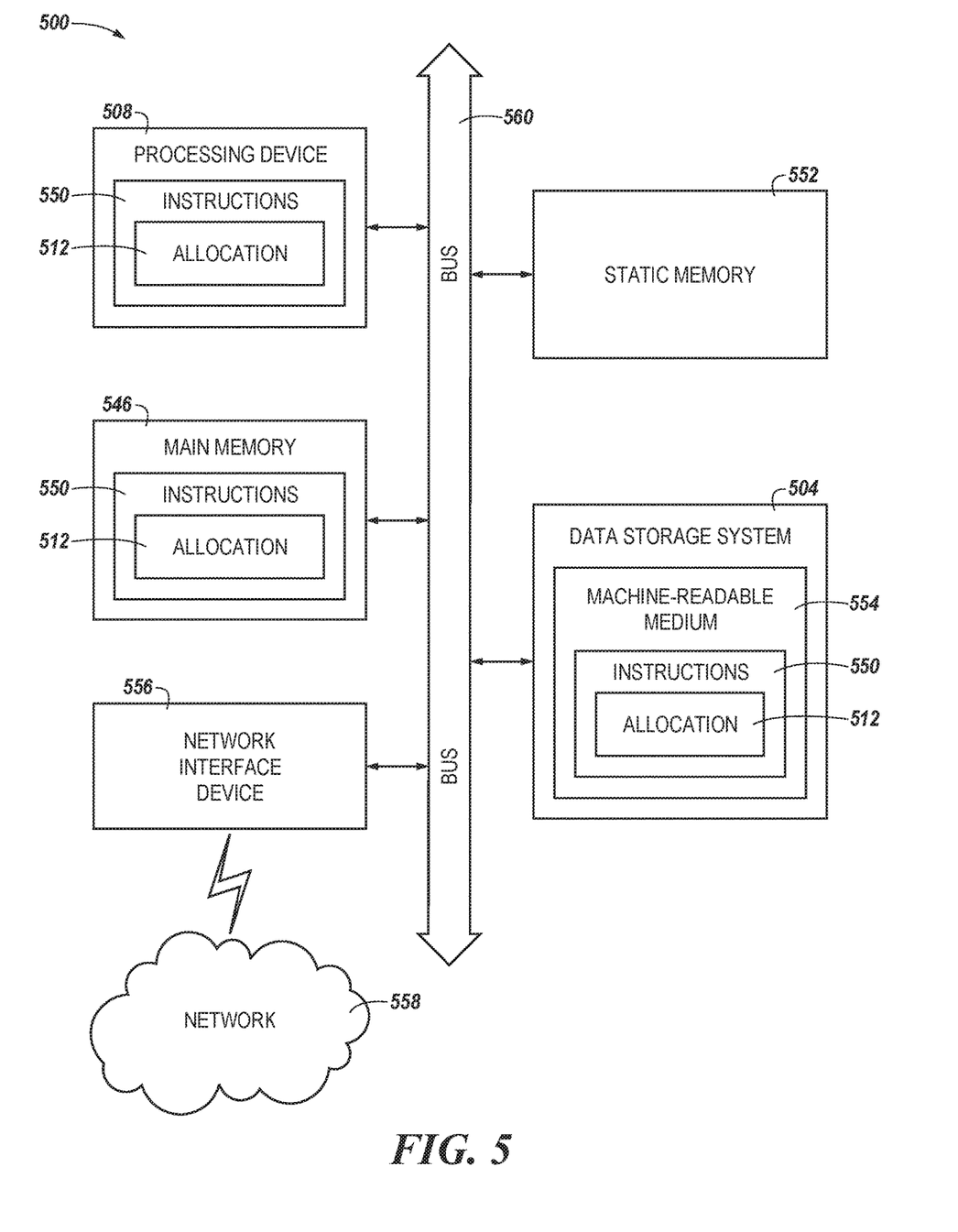
FIG. 5 is a block diagram of an example computer system in which embodiments of the present disclosure may operate.

FIG. 5 is a block diagram of an example computer system in which embodiments of the present disclosure may operate. Within the computing system 500, a set of instructions, for causing a machine to perform one or more of the methodologies discussed herein, can be executed. The computing system 500 includes a processing device 508, a main memory 546, a static memory 552 (e.g., flash memory, static random access memory (SRAM), etc.), and a data storage system 504, which communicate with each other via a bus 560. The data storage system 504 is analogous to the memory sub-system 104 illustrated in FIG. 1.

The processing device 508 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 508 can also be one or more special-purpose processing devices such as an ASIC, an FPGA, a digital signal processor (DSP), network processor, or the like. The processing device 508 is configured to execute instructions 550 for performing the operations and steps discussed herein. The computing system 500 can further include a network interface device 556 to communicate over a network 558.

The data storage system 504 can include a machine-readable storage medium 554 (also known as a computer-readable medium) on which is stored one or more sets of instructions 550 or software embodying one or more of the methodologies or functions described herein. The instructions 550 can also reside, completely or at least partially, within the main memory 546 and/or within the processing device 508 during execution thereof by the computing system 500, the main memory 546 and the processing device 508 also constituting machine-readable storage media.

In one embodiment, the instructions 550 include instructions to implement functionality corresponding to the allocation circuitry 112 of FIG. 1. The instructions can include allocation 512 instructions to allocate a first portion of a plurality of blocks of a memory device for storage of file system metadata based on a file system and a capacity of the memory device. While the machine-readable storage medium 554 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   determining, by a memory controller of a solid state drive, a size of a first portion of a plurality of blocks of a memory device to be allocated based on a file system metadata overhead, ratio associated with a file system and the capacity of the memory device;
   allocating, by the memory controller, the first portion of a plurality of blocks of the memory device for storage of file system metadata;
   writing video data received from a host within a second portion of the plurality of blocks at a first data density; and
   writing file system metadata within the first portion of the plurality of blocks at a second data density lesser than the first data density.

2. The method of claim 1, wherein writing the file system metadata comprises writing the file system metadata in response to receiving data from the host with a flag indicating that the data is file system metadata; and
   wherein writing the video data comprises writing the video data in response to receiving data from the host without the flag.

3. The method of claim 1, further comprising wear leveling the second portion of the plurality of blocks separately from the first portion of the plurality of blocks.

4. The method of claim 3, further comprising preventing reallocation of the first portion of the plurality of blocks unless the file system is reformatted.

5. The method of claim 1, wherein allocating the first portion of the plurality of blocks for storage of file system metadata comprises allocating the first portion of the plurality of blocks during initialization of the file system.

6. The method of claim 1, further comprising writing application metadata with the video data within the second portion of the plurality of blocks; and
   operating the memory device to provide storage for a black box application executed by the host for a vehicle.

7. A system, comprising:
   a memory controller;
   a host interface coupled to the memory controller;
   a memory device coupled to the memory controller;
   wherein the memory controller is configured to:
      determine a file system used by a host;
      determine a size of a portion of the memory device to be allocated based on a file system metadata overhead ratio associated with the file system and the capacity of the memory device;
      allocate the portion of the memory device for storage of flagged data received via the host interface;
      operate memory cells of the portion in a single-level cell mode; and
      operate memory cells of a remainder of the memory device in greater than single-level cell mode for storage of non-flagged data received from the host interface;
   wherein the system comprises a solid state drive.

8. The system of claim 7, wherein the flagged data comprises file system metadata; and
   wherein the non-flagged data comprises other data.

9. The system of claim 8, wherein the memory controller is further configured to prevent blocks of the portion from being reallocated to the remainder of the memory device.

10. The system of claim 9, wherein the memory controller is configured to prevent blocks of the portion from being reallocated to the remainder of the memory device unless the file system is reformatted.

11. The system of claim 7, wherein the memory controller is further configured to determine the file system based on file system metadata received via the host interface.

12. The system of claim 7, wherein the memory controller is further configured to determine the file system based on receipt of a definition of the file system via the host interface.

13. The system of claim 7, wherein the memory controller is further configured to wear level the portion separately from the remainder.

14. The system of claim 7, wherein the memory controller is further configured to:
   write first data to the portion in response to receiving the first data via the host interface with a flag; and
   write second data to the remainder in response to receiving the second data via the host interface without the flag.

15. The system of claim 7, wherein the system comprises an automotive grade solid state drive and the memory device comprises a plurality of memory dies including flash memory cells.

16. A non-transitory machine readable medium storing instructions executable to:
   run a black box application for a vehicle;
   use a memory sub-system to provide storage for the black box application;
   provide a definition of a file system to the memory sub-system to allow the memory sub-system to:
      determine a size of a portion of the memory sub-system to be allocated based on a file system metadata overhead ratio associated with the file system and a capacity of the memory device; and allocate the portion of the memory sub-system for storage of flagged data received via a host interface;

provide file system metadata to the memory sub-system with a flag indicating that the file system metadata is to be written at a first data density;

receive video data from a camera associated with the vehicle; and provide the video data to the memory sub-system without the flag indicating that the video data is to be written at a second data density greater than the first data density.

17. The medium of claim 16, wherein the instructions are executable to:

compress the video data before providing the video data to the memory sub-system; and provide application metadata with the video data to the memory sub-system without the flag.

18. The medium of claim 16, wherein the instructions are executable to provide the definition of the tile system to the memory sub-system prior to providing the file system metadata and the video data to the memory sub-system.

19. The medium of claim 18, wherein the definition of the file system includes an instruction to cause the memory sub-system to store flagged data in the portion of the memory sub-system allocated so as not to be wear leveled with a remainder of the memory sub-system.

* * * * *